Patented June 26, 1934

1,964,629

UNITED STATES PATENT OFFICE 1,964,629

VITREOUS COMPOSITION

Hans Georg Grimm, Heidelberg, and Paul Huppert, Oppau, Germany, assignors to I. G. Farbenindustrie Aktiengesellschaft, Frankfort-on-the-Main, Germany No Drawing. Application August 26, 1931, Serial No. 559,493. In Germany September 19, 1930

6 Claims. (Cl. 106—36.1)

The present invention relates to new vitreous compositions or glasses containing aluminium orthophosphate and process of producing same.

We have found that aluminium orthophosphate, $AlPO_4$, is an excellent vitrifying agent which imparts to the vitreous compositions or glasses produced therefrom some distinct advantages, such as a high resistivity against water, a low coefficient of expansion and a high permeability for ultraviolet rays. The aluminium orthophosphate may be used as the sole vitrifying agent or it may be employed in conjunction with the well-known vitrifying agents, viz. silica and boric oxide, $B_2O_3$, but when used in conjunction with these other vitrifying agents, the aluminium orthophosphate should be employed in an amount corresponding to at least 10 per cent of the total amount of vitrifying agent taken in order to impart to the vitreous compositions the valuable properties inherent to the aluminum orthophosphate. The same basic components or mixtures thereof as are commonly used in the production of silica glasses may also be used to produce the aluminium orthophosphate glasses and the basic components are, generally speaking, also used in the same proportions. In contradistinction, however, to the different kinds of water glass which are soluble in water, the glasses consisting of alkali metal oxide and aluminium orthophosphate are insoluble in water and are resistant to water as is ordinary window glass. As basic components preferably alkali metal oxides if desired together with up to 20 per cent by weight of alkaline earth metal oxides are employed.

The preparation of the aluminium orthophosphate glasses is carried out in a manner similar to the preparation of silica glass. As a general indication of the composition of the batches for the new glasses it may be said that they may be composed in the same manner as those for silica glasses in which the amount of silica is replaced wholly or partly by half the molecular amount of aluminium orthophosphate. The latter may directly be mixed with the other components of the batch, or these latter may be advantageously introduced together with aluminium oxide into a solution of phosphoric acid of any concentration whereupon the mixture is dehydrated and fused. On fusion the mixture will not lose any phosphoric acid by volatilization and therefore it is not necessary to introduce an amount of phosphoric acid into the batch which is larger than that required in the final glass. It is not necessary to introduce the aluminium into the batch in the form of oxide or phosphate, but it may also be introduced in the form of a compound dissociating into oxide and a volatile compound, for example aluminium nitrate, hydroxide or sulphate. Likewise the phosphoric acid may be used as such or in the form of meta- or pyro-phosphoric acid or a salt of these acids. The aluminium compounds and the phosphoric acid must, however, always be present in amounts containing one atomic proportion of phosphorus per each atomic proportion of aluminium. It cannot be ascertained that aluminium orthophosphate is present as such in the finished products in all cases. However, from the identity of the glasses formed when using ortho-, meta-, or pyro-phosphoric acid in the proportion of 1 atomic proportion of phosphorus to 1 atomic proportion of aluminium, it can be concluded that the same vitrifying agent which is most probably aluminium orthophosphate is present in the finished glass.

The addition of boric oxide improves the workability by blowing and drawing of the new glasses by reducing the tendency to devitrification and extending the range of temperature in which the glasses can easily be worked, by increasing the viscosity of the melt. The amount of boric oxide which may be added is larger than that employed with silica glasses and may be as high as 40 per cent by weight of the new glasses together with between 35 and 75 per cent by weight of aluminium orthophosphate and 15 to 35 per cent by weight of basic components.

The following examples will further illustrate how the invention is carried out in practice, but the invention is not restricted thereto. The parts are by weight unless otherwise stated.

*Example 1*

A mixture of 21.4 parts of potassium carbonate, 7.8 parts of potassium nitrate, 19.5 parts of calcium carbonate and 29.6 parts of aluminium oxide is introduced into an aqueous solution of 57 parts of ortho-phosphoric acid. The mixture is dehydrated and then introduced into a fusion vessel. By fusing at from 1500° to 1550° C., a well clarified, colourless glass having the molecular composition $2K_2O.2CaO.3Al_2O_3.3P_2O_5$ is obtained. As especially valuable properties of the glass obtained may be mentioned excellent permeability to ultra-violet light and a stability to water of the same order as that of ordinary window glass, contrasted with phosphate glasses hitherto known. In order to obtain a particularly good permeability to ultra-violet light it is preferable to employ fusion vessels which are as free from iron as possible.

Example 2

A mixture of 40 parts of potassium carbonate, 14.6 parts of potassium nitrate, 27.6 parts of aluminium oxide and 53 parts of orthophosphoric acid is pretreated as described in Example 1 and fused at from 1450° to 1500° C. A colourless, clear glass having the molecular composition $4K_2O.3Al_2O_3.3P_2O_5$ is obtained. The glass obtained is no more attacked by water than ordinary window glass. Moreover, it is distinguished, as the glass described in Example 1, by an excellent permeability to ultra-violet light.

Example 3

A batch consisting of 40.44 parts of potassium nitrate, 40.04 parts of calcium carbonate, 60.98 parts of aluminium oxide and 117.67 parts of phosphoric acid is fused at between 1500° and 1550° C. in a crucible free from iron as far as possible. A colourless glass having an excellent permeability for ultra-violet rays is obtained composed of the following glass forming oxides:

|  | In molecular ratios | In percentage by weight |
| --- | --- | --- |
| $K_2O$ | 11.1 | 10.0 |
| $CaO$ | 22.2 | 12.0 |
| $Al_2O_3$ | 33.3 | 32.5 |
| $P_2O_5$ | 33.3 | 45.5 |

Example 4

64.6 parts of potassium nitrate, 8.02 parts of calcium carbonate and 60.98 parts of aluminium oxide are introduced into an aqueous solution of phosphoric acid containing 117.67 parts of orthophosphoric acid. The mixture is then dehydrated and fused at about 1550° C. The colourless glass thus obtained is composed of the following glass forming oxides:

|  | In molecular ratios | In percentage by weight |
| --- | --- | --- |
| $K_2O$ | 20.0 | 16.7 |
| $CaO$ | 5.0 | 2.5 |
| $Al_2O_3$ | 37.5 | 33.6 |
| $P_2O_5$ | 37.5 | 47.2 |

The glass has a good permeability for ultra-violet rays provided care has been taken to avoid contamination with ferric oxide and titanium dioxide.

Example 5

68.04 parts of monopotassium phosphate ($KH_2PO_4$) and 38.2 parts of aluminium oxide are introduced into an aqueous solution of 24.52 parts of phosphoric acid and the mixture is fused at about 1450° to 1480° C. after dehydration. A colourless glass is thus obtained which surprisingly has a good resistivity against hydrolysis. It is composed of the following glass forming oxides:

|  | In molecular ratios | In percentage by weight |
| --- | --- | --- |
| $K_2O$ | 25.0 | 20.5 |
| $Al_2O_3$ | 37.5 | 33.1 |
| $P_2O_5$ | 37.5 | 46.4 |

Example 6

A mixture of 80.88 parts of potassium nitrate, 78.96 parts of barium carbonate and 61.16 parts of aluminium oxide is introduced into an aqueous solution of 117.68 parts of phosphoric acid, the whole being then dehydrated and fused at between 1500° and 1550° C. A glass is thus obtained consisting of the following glass forming oxides:

|  | In molecular ratios | In percentage by weight |
| --- | --- | --- |
| $K_2O$ | 20.0 | 15.4 |
| $BaO$ | 20.0 | 25.0 |
| $Al_2O_3$ | 30.0 | 24.9 |
| $P_2O_5$ | 30.0 | 34.7 |

Example 7

A lead glass is obtained by melting at about 1400° C. the following batch: 44.2 parts of potassium carbonate, 16.18 parts of potassium nitrate, 91.5 parts of minium, 61.16 parts of aluminium oxide and 117.68 parts of phosphoric acid. The glass is composed of the following glass forming oxides:

|  | In molecular ratios | In percentage by weight |
| --- | --- | --- |
| $K_2O$ | 20.0 | 13.7 |
| $PbO$ | 20.0 | 32.7 |
| $Al_2O_3$ | 30.0 | 22.4 |
| $P_2O_5$ | 30.0 | 31.2 |

Example 8

A colourless glass is obtained by melting at about 1400° C. in crucibles practically free from iron a batch consisting of 68.01 parts of sodium nitrate, 28.83 parts of silica, 18.33 parts of aluminium oxide and 35.35 parts of phosphoric acid. The glass thus obtained is composed of the following oxides:

|  | In molecular ratios | In percentage by weight |
| --- | --- | --- |
| $Na_2O$ | 32.25 | 25.4 |
| $SiO_2$ | 38.75 | 29.6 |
| $Al_2O_3$ | 14.5 | 18.8 |
| $P_2O_5$ | 14.5 | 26.2 |

Example 9

A batch consisting of 68.01 parts of sodium nitrate, 14.41 parts of silica, 24.41 parts of aluminium oxide and 47.21 parts of phosphoric acid is fused at between 1300° and 1350° C., and a colourless glass is obtained composed of:

|  | In molecular ratios | In percentage by weight |
| --- | --- | --- |
| $Na_2O$ | 35.71 | 25.4 |
| $SiO_2$ | 21.43 | 14.7 |
| $Al_2O_3$ | 21.43 | 25.0 |
| $P_2O_5$ | 21.43 | 34.9 |

By replacing in the foregoing batch the 68,01 parts of sodium nitrate by 80,88 parts of potassium nitrate a glass is obtained of the same molecular composition consisting of:

$K_2O$    34.0
$SiO_2$    13.0
$Al_2O_3$    22.1
$P_2O_5$    30.9 in percentage by weight.

Example 10

A glass of a good thermic resistivity having a high softening point and a low coefficient of expansion is obtained by fusing a batch consisting of 109 parts of monopotassium phosphate, 96.1 parts of silica and 40.78 parts of aluminium oxide at about 1550° C. The colourless glass is composed of the following oxides:

|  | In molecular ratios | In percentage by weight |
| --- | --- | --- |
| $K_2O$ | 14.3 | 16.3 |
| $SiO_2$ | 57.1 | 41.6 |
| $Al_2O_3$ | 14.3 | 17.6 |
| $P_2O_5$ | 14.3 | 24.5 |

Example 11

A glass having good thermic properties is obtained by fusing at about 1550° C., a batch consisting of 54.5 parts of monopotassium phosphate, 27.64 parts of potassium carbonate, 48.05 parts of silica and 20.39 parts of aluminium oxide. The glass is composed of the following oxides:

|  | In molecular ratios | In percentage by weight |
| --- | --- | --- |
| $K_2O$ | 25.0 | 28.0 |
| $SiO_2$ | 50.0 | 35.8 |
| $Al_2O_3$ | 12.5 | 15.1 |
| $P_2O_5$ | 12.5 | 21.1 |

Example 12

A colourless glass is obtained by melting at between 1500° and 1550° C. a batch consisting of 80.88 parts of potassium nitrate, 68.01 parts of sodium nitrate, 96.1 parts of silica, 40.78 parts of aluminium oxide and 78.45 parts of phosphoric acid. The glass obtained is composed of the following oxides:

|  | In molecular ratios | In percentage by weight |
| --- | --- | --- |
| $K_2O$ | 12.5 | 14.7 |
| $Na_2O$ | 12.5 | 9.7 |
| $SiO_2$ | 50.0 | 37.5 |
| $Al_2O_3$ | 12.5 | 15.9 |
| $P_2O_5$ | 12.5 | 22.2 |

Example 13

A glass containing titanium dioxide is obtained by melting at about 1300° C. a batch consisting of 80.88 parts of potassium nitrate, 40.03 parts of calcium carbonate, 19.23 parts of titanium dioxide, 55.04 parts of aluminium oxide and 105.9 parts of phosphoric acid. A nearly colourless glass having a slight yellowish hue is obtained composed of the following oxides:

|  | In molecular ratios | In percentage by weight |
| --- | --- | --- |
| $K_2O$ | 18.87 | 17.9 |
| $CaO$ | 18.87 | 10.6 |
| $TiO_2$ | 11.32 | 9.1 |
| $Al_2O_3$ | 25.47 | 26.1 |
| $P_2O_5$ | 25.47 | 36.3 |

Example 14

A glass free from alkali metal oxide is obtained by melting at about 1300° C. a batch consisting of 198.73 parts of lead nitrate, 10.19 parts of aluminium oxide and 19.61 parts of phosphoric acid. A clear yellow glass of the composition

|  | In molecular ratios | In percentage by weight |
| --- | --- | --- |
| $PbO$ | 75.0 | 84.6 |
| $Al_2O_3$ | 12.5 | 6.4 |
| $P_2O_5$ | 12.5 | 9.0 | is obtained.

Example 15

A batch consisting of 204.4 parts of monopotassium phosphate, 34.82 parts of boric oxide and 76.44 parts of aluminium oxide is fused at between 1300° and 1400° C. in a crucible free as far as possible from iron. A glass which is readily workable in the blast lamp and has a good permeability for ultra-violet rays is thus obtained of the following composition:

|  | In molecular ratios | In percentage by weight |
| --- | --- | --- |
| $K_2O$ | 27.27 | 24.5 |
| $B_2O_3$ | 18.2 | 12.1 |
| $Al_2O_3$ | 27.27 | 26.5 |
| $P_2O_5$ | 27.27 | 36.9 |

Example 16

A clear colourless glass is obtained by melting at about 1450° C. a batch consisting of 68.08 parts of monopotassium phosphate, 17.41 parts of boric oxide, 38.22 parts of aluminium oxide and 12.27 parts of phosphoric acid. The glass is composed of the following oxides:

|  | In molecular ratios | In percentage by weight |
| --- | --- | --- |
| $K_2O$ | 20 | 17.8 |
| $B_2O_3$ | 20 | 13.2 |
| $Al_2O_3$ | 30 | 28.8 |
| $P_2O_5$ | 30 | 40.2 |

Example 17

A colourless glass which is readily workable in the blast lamp is obtained by melting at between 1400° and 1450° C. a batch consisting of 204.4 parts of monopotassium phosphate, 8.71 parts of boric oxide and 76.44 parts of aluminium oxide. The glass is composed of the following oxides:

|  | In molecular ratios | In percentage by weight |
| --- | --- | --- |
| $K_2O$ | 31.6 | 27.0 |
| $B_2O_3$ | 5.2 | 3.3 |
| $Al_2O_3$ | 31.6 | 29.1 |
| $P_2O_5$ | 31.6 | 40.6 |

Example 18

By melting at about 1100° C. a batch consisting of 33.55 parts of monopotassium phosphate, 27.02 parts of potassium carbonate, 40.0 parts of boric oxide and 12.52 parts of aluminium oxide a colourless glass of the following composition is obtained:

|  | In molecular ratios | In percentage by weight |
| --- | --- | --- |
| $K_2O$ | 28.0 | 30.0 |
| $B_2O_3$ | 50.4 | 40.0 |
| $Al_2O_3$ | 10.8 | 12.52 |
| $P_2O_5$ | 10.8 | 17.48 |

Example 19

44.65 parts of monopotassium phosphate, 6.66 parts of potassium carbonate, 40.0 parts of boric oxide and 16.7 parts of aluminium oxide are mixed and fused at about 1200° C. A glass composed of the following oxides is obtained:

|  | In molecular ratios | In percentage by weight |
| --- | --- | --- |
| $K_2O$ | 19.1 | 20.0 |
| $B_2O_3$ | 51.5 | 40.0 |
| $Al_2O_3$ | 14.7 | 16.7 |
| $P_2O_5$ | 14.7 | 23.3 |

Example 20

A batch consisting of 44.65 parts of monopotassium phosphate, 30.0 parts of boric oxide, 21.38 parts of potassium carbonate and 16.7 parts of aluminium oxide is fused at about 1200° C. The resulting colourless glass has the following composition:

|  | In molecular ratios | In percentage by weight |
| --- | --- | --- |
| $K_2O$ | 29.6 | 30.0 |
| $B_2O_3$ | 40.0 | 30.0 |
| $Al_2O_3$ | 15.2 | 16.7 |
| $P_2O_5$ | 15.2 | 23.3 |

Example 21

A batch consisting of 102.2 parts of monopotassium phosphate, 12.52 parts of calcium carbonate, 8.71 parts of boric oxide and 38.22 parts of aluminium oxide is fused at about 1400° C. in a crucible as free from iron as possible. An absolutely colourless glass which is readily workable in the blast lamp and permeable to ultra-violet rays up to 230 $\mu\mu$ is thus obtained. The glass has the following composition:

|  | In molecular ratios | In percentage by weight |
| --- | --- | --- |
| $K_2O$ | 27.27 | 24.8 |
| $CaO$ | 9.1 | 4.9 |
| $B_2O_3$ | 9.1 | 6.1 |
| $Al_2O_3$ | 27.27 | 26.8 |
| $P_2O_5$ | 27.27 | 37.4 |

Example 22

A colourless glass workable in the blast lamp having the following composition:

|  | In molecular ratios | In percentage by weight |
| --- | --- | --- |
| $K_2O$ | 23.0 | 20.4 |
| $CaO$ | 7.7 | 4.1 |
| $B_2O_3$ | 7.7 | 5.0 |
| $Al_2O_3$ | 30.8 | 29.4 |
| $P_2O_5$ | 30.8 | 41.1 | is obtained by melting at about 1550° C. a batch consisting of 102.2 parts of monopotassium phosphate, 21.52 parts of dicalcium phosphate ($CaHPO_4 \cdot 2H_2O$), 8.71 parts of boric oxide, 50.97 parts of aluminium oxide and 12.27 parts of phosphoric acid.

Example 23

A glass containing zinc oxide as basic component is obtained by melting at about 1300° C. a batch consisting of 102.2 parts of monopotassium phosphate, 10.17 parts of zinc oxide, 8.71 parts of boric oxide and 38.22 parts of aluminium oxide. The glass obtained is colourless and readily workable and also permeable to ultraviolet rays in case contamination by means of ferric oxide and titanium dioxide is prevented. The glass has the following composition:

|  | In molecular ratios | In percentage by weight |
| --- | --- | --- |
| $K_2O$ | 27.27 | 24.2 |
| $ZnO$ | 9.1 | 7.0 |
| $B_2O_3$ | 9.1 | 6.0 |
| $Al_2O_3$ | 27.27 | 26.2 |
| $P_2O_5$ | 27.27 | 36.6 |

Example 24

A colourless readily workable glass is obtained by melting at about 1300°C. a batch consisting of 102.2 parts of monopotassium phosphate, 10.54 parts of magnesium carbonate, 8.71 parts of boric oxide and 38.22 parts of aluminium oxide. The glass has a good permeability for ultra-violet rays and is composed of the following oxides:

|  | In molecular ratios | In percentage by weight |
| --- | --- | --- |
| $K_2O$ | 27.27 | 25.1 |
| $MgO$ | 9.1 | 3.6 |
| $B_2O_3$ | 9.1 | 6.2 |
| $Al_2O_3$ | 27.27 | 27.2 |
| $P_2O_5$ | 27.27 | 37.9 |

Example 25

A glass containing barium oxide and having likewise a good permeability for ultra-violet rays is obtained by melting at between 1250° and 1300° C. a batch consisting of 204.4 parts of monopotassium phosphate, 49.34 parts of barium carbonate, 17.42 parts of boric oxide and 76.44 parts of aluminium oxide. The glass is composed of the following oxides:

|  | In molecular ratios | In percentage by weight |
| --- | --- | --- |
| $K_2O$ | 27.27 | 22.8 |
| $BaO$ | 9.1 | 12.4 |
| $B_2O_3$ | 9.1 | 5.6 |
| $Al_2O_3$ | 27.27 | 24.7 |
| $P_2O_5$ | 27.27 | 34.5 |

What we claim is:—

1. A vitreous composition consisting of a fused mixture comprising an oxidic component and a vitrifying component containing equimolecular proportions of $Al_2O_3$ and $P_2O_5$ in a total amount of from 10 to 100 per cent by weight of the vitrifying component.

2. A vitreous composition consisting of a fused mixture comprising a basic component and a vitrifying component containing equimolecular proportions of $Al_2O_3$ and $P_2O_5$ in a total amount of from 10 to 100 per cent by weight of the vitrifying component.

3. A vitreous composition consisting of a fused mixture comprising an oxidic component and a vitrifying component containing equimolecular proportions of $Al_2O_3$ and $P_2O_5$ in a total amount of from 10 to 100 per cent by weight of the vitrifying component, the remaining part of the vitrifying component consisting of a compound selected from the group consisting of silica and boric acid.

4. A vitreous composition consisting of a fused mixture comprising a basic component consisting of an alkali metal oxide together with up to 20 per cent by weight of an alkaline earth metal oxide calculated on the vitreous composition, and a vitrifying component containing equimolecular proportions of $Al_2O_3$ and $P_2O_5$ in a total amount of from 10 to 100 per cent by weight of the vitrifying component, the remaining part of the vitrifying component consisting of a compound selected from the group consisting of silica and boric acid.

5. A vitreous composition consisting of a fused mixture comprising a basic component consisting of an alkali metal oxide together with up to 20 per cent by weight of an alkaline earth metal oxide calculated on the vitreous composition and a vitrifying component containing equimolecular proportions of $Al_2O_3$ and $P_2O_5$ in a total amount of from 10 to 100 per cent by weight of the vitrifying component.

6. A vitreous composition consisting of a fused mixture comprising between 15 and 35 per cent of a basic component and a vitrifying component containing equimolecular proportions of $Al_2O_3$ and $P_2O_5$ in a total amount of from 35 to 75 per cent by weight of the vitrifying component and containing up to 40 per cent by weight of boric oxide.

HANS GEORG GRIMM.
PAUL HUPPERT.